March 3, 1953 E. M. STEIN ET AL 2,630,259
METHOD AND MEANS FOR DISPENSING BEVERAGES
Filed April 23, 1949
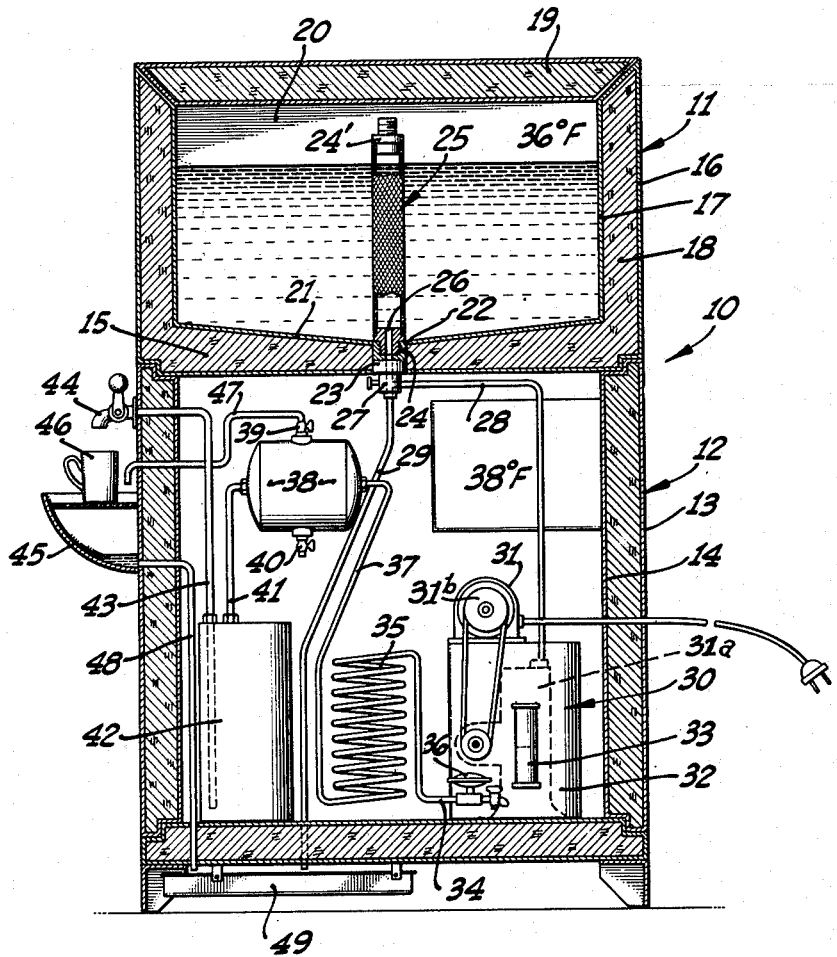
HERMAN H. STEIN,
EDWARD M. STEIN,
INVENTORS.
BY James M. Abbott
ATTORNEY.

UNITED STATES PATENT OFFICE 2,630,259

METHOD AND MEANS FOR DISPENSING BEVERAGES

Edward M. Stein and Herman H. Stein, Barstow, Calif.

Application April 23, 1949, Serial No. 89,262

1 Claim. (Cl. 225—21)

This invention relates to a beverage dispenser, and particularly pertains to a method and means for dispensing beverages.

At the present time it is common practice to provide relatively small beverage dispensers, such as are used for root beer, and in which a beverage mix is carbonated and dispensed. In the operation of these particular devices it has been found difficult to maintain the beverage mix at a temperature suitable for carbonation and to carbonate the mixture as it is drawn from the source of supply to a discharge spigot without creating an excessive amount of foam at the point of discharge. It is the principal object of the present invention, therefore, to provide a method and means for storing a beverage mix and performing a carbonation operation upon it as it is drawn from a storage supply to a discharge spigot, the said method and apparatus insuring that irrespective of the demands upon the apparatus the carbonated beverage will at all times be uniform in character and will not create an excessive amount of foam as the beverage is discharged from a spigot into a suitable receptacle.

The present invention contemplates the provision of a cabinet enclosing a beverage mix storage tank and suitable carbonation equipment, all of which are maintained under a desired degree of refrigeration, which structure provides means for passing the carbonated beverage through a low pressure area whereby excessive foaming of the beverage at the point of discharge will be eliminated.

The invention is illustrated by way of example in the accompanying drawing, in which the figure is a view in central vertical section showing a carbonating machine in which the present invention is incorporated.

Referring more particularly to the drawing, 10 indicates a cabinet for a carbonated beverage dispenser. This structure comprises an upper compartment 11 and a lower compartment 12. The lower compartment 12 is formed with an outer wall 13 and an inner wall 14 between which heat-insulating material is disposed. The upper compartment 11 is also heat-insulated and the bottom 15 thereof covers the lower compartment 12 so that the latter will provide a fully sealed heat-insulated enclosure within which the operating parts of the present invention may be disposed. The upper compartment 11 is defined by an outer wall 16 and an inner wall 17. The walls 16 and 17 are spaced from each other to accommodate heat-insulating material 18. At the top of the compartment 11 is a closure 19 which may be removed so that access may be had to a mix tank 20, which is defined by the walls of the upper compartment 11.

The mix tank 20 is provided to receive a mixture of water, sugar, and the particular syrup which will give the flavor of the beverage, such as root beer syrup. The bottom 15 of this tank is formed with an inner wall 21 having an opening 22 through it. The opening 22 permits an outflow of liquid from the tank. Disposed below the opening is a threaded coupling 23 which optionally receives a threaded connection 24 or a threaded plug 24'. These members are carried at the opposite ends of a tubular strainer 25. The connection 24 has a central opening 26 through it. These members may be interchangeably positioned in threaded relation to the coupling 23 by turning the strainer end for end. The lower end of the coupling 23 is provided with a two-way connection controlled by a valve 27. This directs liquid from the tank 10 into a feed tube 28 or into a drain tube 29. The feed tube 28 leads to a carbonation unit 30. This of course includes a motor 31 and a gas holder 32. The motor drives a pump 31a, located behind holder 32, by a suitable belt and pulley structure 31b. The liquid mix is delivered to pump 31a by tube 28 and is pumped directly from the pump into gas holder 32. A level gauge 33 is directly connected with the gas holder 32 and indicates the level at which the liquid mix has accumulated. Leading from the lower end of the carbonation unit 30 is a draw-off pipe 34 which connects with a resistance coil 35. The resistance coil is in reality a tubular helix which adds considerable length to the travel of the liquid and checks its flow. If desired, a suitable pressure regulator 36 is interposed in the length of the tube 34. The opposite end of the coil 35 is connected with a feed tube 37 which in turn is connected to a settling tank 38.

The settling tank is of considerable importance in the present case since the beverage has been pre-carbonated and although its rate of flow has been reduced while it passes through the coil 35, the beverage when released from the apparatus may create an objectionable amount of foam. By passing the pre-carbonated beverage through a tank of relatively large area, such as the settling tank 38, there is not a tendency for the beverage to foam and it therefore may be drawn rapidly from the apparatus into a glass. At the top of the settling tank, a valve 39 is provided. This permits any air in the settling tank to be purged from the tank as it is displaced by the inflowing liquid. A draw-off valve 40 is disposed at the bottom of the tank so that the tank may be cleaned when desired. Attached to the tank 38 is a tube 41 which leads to a cooler 42 within which the beverage is cooled to a desired temperature. A draw-off pipe 43 is placed in communication with the cooler 42 at one end and in communication with a spigot 44 at its opposite end. The spigot is disposed above a drain bowl 45 which is mounted upon the side of the dispensing cabinet and into which a mug 46 may be placed for filling. It may be found convenient to attach a tube 47 to the valve 39 so that any foam which is released from the tank by the valve 39 will flow into the drain bowl 45 when the tank 38 is purged. A suitable drain pipe 48 is connected with the drain and leads to a sewer connection 49. For convenience, the drain pipe 29 leads from the coupling 23 to the sewer connection 49, thus making it possible to drain out any portion of the contents of the tank 20.

In operating the present invention a suitable mix is prepared and placed in the mix tank 20. The valve 27 is adjusted so that the drain tube 29 will be closed and the feed tube 28 will be open. The mixed liquid, which comprises water, sugar and beverage syrup, then flows through the screen strainer 25 and then through the opening 26 of connection 24 and into the coupling 23. The valve 27 thereafter diverts the flow of liquid into the feed tube 28 so that the beverage mix may then flow to the carbonation unit 30. It is to be understood that in order to perform a suitable carbonation operation the tank 20 is maintained at a temperature of approximately 36° F., and the lower compartment 12 is maintained at a temperature not to exceed 38° F. This facilitates the carbonation process. After the carbonated beverage is released from the carbonator 30 it flows through pipe 34 and the coil 35 to the tube 37. As previously stated, the relatively long length of the conduit in the coil 35 will tend to check the flow of fluid. This will prevent it from being discharged into the settling tank 38 with any considerable force. While the settling tank 38 is being filled, the valve 39 may be left open to purge the air out of the tank. When this operation has been completed the valve 39 is closed and the carbonated beverage is conducted through the tube 41 to the cooler 42. The fluid will then flow upwardly through the tube 43 to the spigot when the spigot is open.

As previously set forth, the prime object of the structure is to provide a carbonation cabinet from which carbonated liquid may be released without creating an excessive and objectionable amount of foam in the receptacle which is filled with the liquid. The relatively large volume of the settling tank 38 as compared with feed tube 37 will create a low pressure area through which the liquid flows and thus a tendency to foam will be diminished.

When it is desired to clean the structure, the valve 27 may be adjusted so that flow of liquid will be interrupted through the tube 28 and will be established through the drain tube 29. This will allow the tank 20 to be drained for cleaning purposes. If desired, the strainer 25 may be removed from its initial position and reversed so that its opposite end 24' may be threaded into the coupling 23 to close the opening through the bottom of the tank. If the settling tank 38 becomes clogged or an accumulation of sediment occurs within the tank, the cleanout valve 40 may be opened to allow fluid and extraneous matter to drain from the tank.

It will thus be seen that the structure here disclosed provides simple and effective means for carbonating a beverage mix and for discharging it into receptacles without an excessive foaming action.

While we have shown a preferred form of the apparatus of the present invention it is to be understood that various changes may be made in this by those skilled in the art without departing from the spirit of the invention as claimed.

Having thus described our invention, what we claim and desire to secure by Letters Patent is:

In a beverage dispensing device, the combination of: a heat insulated cabinet; a mix tank in the top thereof into which a beverage mix may be introduced; a carbonating unit including a pump in said cabinet; a conduit connecting said tank and said pump; a closed settling tank of relatively large volume; a relatively long coil of tubing in said cabinet connecting said settling tank with said carbonating unit; a cooling tank; a conduit connecting said settling tank with the upper end of said cooling tank; a draft spigot mounted on the outside of said cabinet; a drain bowl mounted on said cabinet beneath said spigot; a conduit connecting said spigot with the lower end of said cooling tank; a gas release valve provided in the upper end of said settling tank; a conduit connected with said gas release valve for conveying away gas escaping therefrom; and a conduit connecting with said drain bowl for carrying away liquid draining thereinto.

EDWARD M. STEIN.
HERMAN H. STEIN.

REFERENCES CITED

The following references are of record in the file of this patent:

UNITED STATES PATENTS

| Number | Name | Date |
|---|---|---|
| Re. 11,745 | Friedrich | June 6, 1899 |
| 481,838 | Wolf | Aug. 10, 1892 |
| 638,787 | Wolf | Dec. 12, 1899 |
| 1,062,343 | Mahoney | May 20, 1913 |
| 1,596,893 | Schifter | Aug. 24, 1926 |
| 2,035,391 | Lear | Mar. 24, 1936 |
| 2,136,973 | Hergott | Nov. 15, 1938 |
| 2,241,018 | Lloyd | May 6, 1941 |
| 2,383,771 | Chace | Aug. 28, 1945 |